Jan. 9, 1945. H. C. BROWN, JR., ET AL 2,367,093
MANUFACTURE OF INSULATING PRODUCTS
Filed Jan. 7, 1943
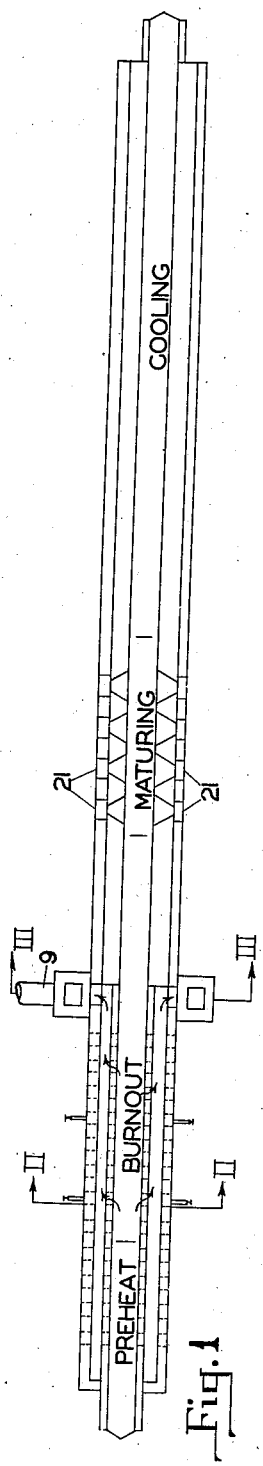
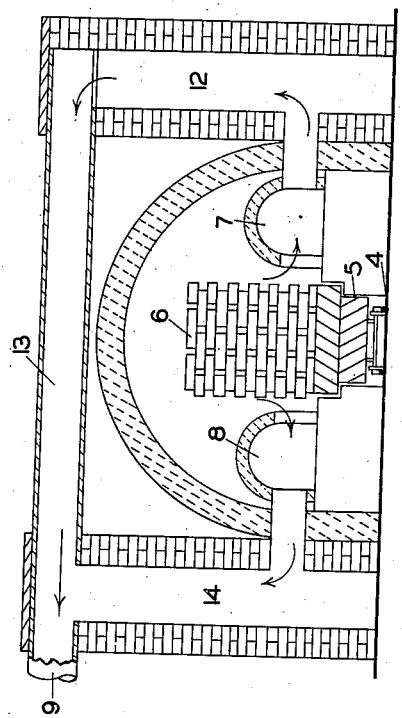
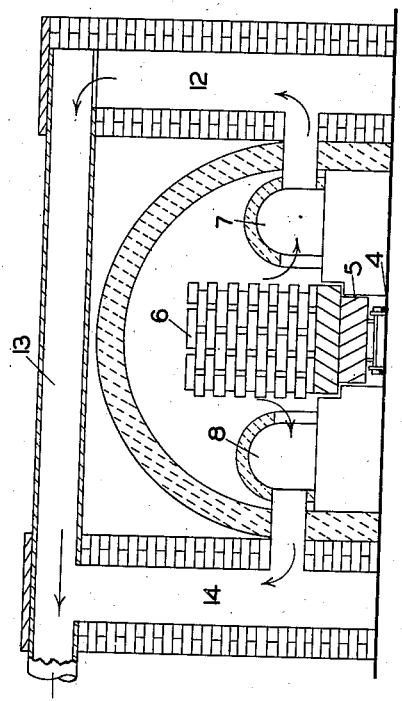
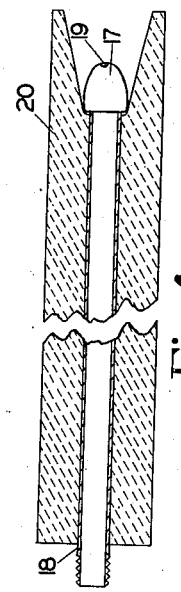

Patented Jan. 9, 1945

2,367,093

UNITED STATES PATENT OFFICE 2,367,093

MANUFACTURE OF INSULATING PRODUCTS

Henry C. Brown, Jr., Beaver Falls, and Boyd R. Abbott, Norristown, Pa., assignors to Armstrong Cork Company, Lancaster, Pa., a corporation of Pennsylvania Application January 7, 1943, Serial No. 471,574

6 Claims. (Cl. 25—157)

This invention relates to the manufacture of insulating firebrick, blocks, and other shapes. It is directed more particularly to a method and apparatus for producing such articles from a body of ceramic material, as clay, containing a combustible material embedded therein, as cork granules, which is burned out of the body during firing, leaving a porous, heat-insulating refractory product.

In the manufacture of articles of this sort, one practice commonly followed is to prepare a stiff mix of clay and combustible material which is formed into the desired shape, such as bricks by mold formation, extrusion, or the like. The bricks are then stacked on cars and introduced into a heated brick kiln of conventional form. Such kilns include three zones; a preheat zone, where the bricks are heated and any residual water is driven off and any volatile ingredients, such as certain of the highly volatile materials which may be present in the resinous material in the cork granules, are volatilized and passed off; a burn-out zone where the cork granules or other combustible material is ignited and burned; and a maturing zone where the bricks are subjected to a temperature sufficient to fire, cure, or mature the clay forming the body. There is not a physical barrier or separator between the zones in the kiln, but the zones are more or less well defined by the operating conditions, temperatures, etc. therein.

In insulating refractory brick manufacture where combustible materials are burned out, there has always been a problem of preventing undue rise in the temperature of the article induced by the combustion of the cork or other combustible material. If the temperature is allowed to rise unrestrictedly, deterioration of the clay occurs. Excessive temperatures may also cause cracking of the bricks and bonding of adjacent bricks in the setting due to incipient fusion at the lines of juncture. It is desirable, therefore, to provide for close control of the temperature conditions in the so-called burn-out zone of the kiln.

It is not commercially feasible to reduce the temperature in the burn-out zone by cutting down the draft in the kiln, for then the production rate is materially decreased. Air cooling is impracticable because of the introduction of oxygen which accelerates combustion and leads to a temperature increase rather than a decrease. The use of inert gases such as nitrogen has been tried, but they are too expensive for anything more than theoretical or experimental consideration. The use of steam is common and serves in effect to displace oxygen with an incombustible gas in the kiln preventing rapid combustion of the combustible material by blanketing the whole area and displacing the air which is necessary to support combustion. Large quantities of steam are required to effectively blanket the area and prevent a rise in temperature. This is expensive and objectionable for other reasons. While some heat is absorbed by the steam, the amount is quite limited and the primary effect of the introduction of steam is, as mentioned before, to displace air in the kiln and substitute an incombustible gas. This has the effect of preventing temperature rise but as would be expected, the volume of steam required is high, and since combustion of the combustible material must be complete prior to final maturing of the brick, limitation of combustion is not desirable for the rate of production is decreased.

The primary object of the present invention is to provide for close control of the temperature of the ceramic body in the burn-out zone of the kiln, thus obviating the difficulties heretofore encountered. Another object of the invention is to accelerate the burning, increase the draft, and decrease the time required for completion of the burning cycle. These objects are attained by the introduction into the burn-out zone of a medium which is effective for absorbing enormous quantities of heat, permitting close temperature control to be established within a limited zone in the kiln, and making possible the introduction of large quantities of air into the kiln, increasing the rate of combustion without excessive temperature rise.

The invention is not concerned with the procedure employed in the formation of the bodies which are placed in the kiln; it is concerned with the burning or firing of the formed body. The bodies may be in the form of bricks, blocks, or other shapes and may be formed with clays of a wide variety of types suitable for a diversity of uses and may include ground cork, sawdust, chopped straw or other combustible material. The apparatus may be part of and the method may be practiced successfully in a continuous kiln, a periodic kiln, or in fact in any firing kiln or burning oven. The invention will be described in connection with a continuous kiln since it is one of the types most commonly used in the burning of insulating firebrick.

In a continuous kiln, the bodies, such as bricks, are loaded on kiln cars as brick settings and the cars are introduced into the kiln and pass slowly therethrough, entering first the preheat zone, and then the burn-out, maturing, and cooling zones.

In the burn-out zone, there is provided a series of jets which are effective for introducing into the kiln a fine mist of water. The water is finely atomized so as to be divided into minute particles and is directed into the kiln at the sides or above the loaded cars. The subdivision of the water is such that there is no tendency for the water spray to "wash down" the brick. In fact, the spray is so finely divided that it is elevated to a point well above the boiling point almost instantaneously. In attaining this temperature, an enormous amount of heat is absorbed which would otherwise elevate the temperature in the burn-out zone to or above the danger point where cracking, spalling, or incipient fusion occurs. The water is preferably introduced at its normal temperature 50° F.–80° F. and the evaporation of the water is effective for materially reducing the temperature of the kiln in the burn-out zone.

The heat absorbed in bringing the water from its initial temperature, say 60° F. to a desired temperature in the burn-out zone of about 1750° F., for example, is about 1900 B. t. u.'s per pound of water. As a matter of fact, 970 B. t. u.'s per pound, the latent heat of evaporation of water, are required to change water at 212° F. to steam at the same temperature. The remaining absorption of heat is in the elevation of the water from 60° F. to 212° F. and the elevation of the vapor from 212° F. to 1750° F. With steam, the total heat absorption per pound is only about 800 B. t. u.'s.

It is not necessary, as was common practice with the use of steam, to blanket the whole area and thus prevent the oxygen of the air in the kiln from combining with the combustible material in the block. The air is permitted to have substantially free access to the bricks since temperature rise is controlled by heat absorption rather than by elimination of oxygen. Since the desired end is to burn out the combustible material, the steam process heretofore practiced reduced the rate of production because it limited combustion. By the present invention combustion is unrestricted and may in fact be accelerated so that by practice of the present invention, not only is the temperature in the burn-out zone decreased by heat absorption and a high quality product produced, but the rate of production is materially increased. This occurs because the volume of vapor from the heat absorbent material is much less than when steam is used and thus a greater volume of air can be pulled through the kiln by the draft of the stack; this being possible only because of the enormous heat absorption of the water mist making possible a faster movement of air through the burn-out zone without overheating. Operating with steam under the same conditions results in a much lower production rate because of the large volume of steam displacing air in the burn-out zone and in the stack. If the height of the stack were increased or other means resorted to for increased draft, the movement of air through the burn-out zone would be accelerated but then the temperature in the burn-out zone would rise above the desired limit due to the fact that the steam serves primarily as a blanketing means for excluding air in the burn-out zone and absorbs only an incidental amount of heat.

The invention will be described more specifically in connection with the accompanying drawing in which:

Figure 1 is a diagrammatic view showing a continuous brick kiln in which the apparatus of this invention has been shown;

Figure 2 is a diagrammatic sectional view showing the interior of the kiln as it would appear along the line II—II of Figure 1;

Figure 3 is a diagrammatic sectional view showing the interior of the kiln at the stack as it would appear along the line III—III of Figure 1; and Figure 4 is a sectional view showing the water mist nozzle arrangement.

In Figure 1 the general positions of the preheat, burn-out, maturing, and cooling zones have been indicated. In this view, the charging end of the kiln is shown at the left and the discharging end at the right.

Referring to Figure 2, the kiln is formed with a masonry wall structure 2 and an arch 3 of firebrick or other refractory material. A trackway 4 is provided in the center of the kiln for the movement of kiln cars 5 through the kiln either intermittently or continuously as desired. A brick setting 6 has been shown on the kiln car 5. The bricks, blocks or other shapes as introduced into the kiln are formed to the desired shape and are partially dried but are in a moist, unburned condition. As the car moves through the initial drying or preheating zone, moisture is removed from the bricks and, as pointed out previously, certain of the more volatile ingredients are passed off through flues 7 and 8 which are provided on the opposite sides or longitudinal edges of the kiln. These flues are directly connected to a stack 9 which is effective for drawing off gases and vapors originating in the kiln and for replacing such gases with air from the ambient atmosphere. Adjustable flue dampers 10 are provided at spaced locations along the drying or preheat zone and the burn-out zone. These dampers are manually controlled by handles 11 which pass through the arch and the masonry walls, and are effective for adjusting the pull of the stack at various locations along the path of movement of the kiln cars through the burn-out zone. The flues 7 and 8 are connected to the stack as shown in Figure 3; the flue 7 on the right-hand side in Figure 3 being connected to the stack through a smoke pipe 12 and a horizontal pipe 13. The flue 8 is directly connected to the stack by the smoke pipe 14.

The foregoing description of the kiln is illustrative of a common type of continuous kiln used in the production of insulating firebricks and other refractory products.

Referring to Figure 1 again, it will be observed that there is provided in the burn-out zone opposite pairs of water mist nozzles 15 and 16, two pairs being shown in Figure 1. In the manufacture of insulating firebrick suitable for use up to temperatures of 2300° F., for example, with cork as the combustible material and clay as the primary constituent of the brick, it has been found that four water mist nozzles are sufficient when operated to supply about one-quarter of a gallon of water per minute per nozzle and will maintain the temperature of the burn-out zone at about 1750° F. The rate of supply of the mist will depend upon the type of combustible material employed, the amount used in the bricks, the size of the charge of material to be fired in the kiln, the temperature desired in the burn-out zone, the draft conditions, and other variable factors. This can be determined from the existing conditions and the supply of water to the nozzles adjusted accordingly. Minute control can be effected by merely adjusting the amount of water supplied to the nozzles, for the heat absorption is so great that even minor changes in the supply of water are almost immediately noticeable in the temperature of the kiln in the burn-out zone. The number of nozzles and their location in the burn-out zone may be varied depending upon operating conditions. Generally, the highest temperature obtains in the middle of the burn-out zone and it is desirable to have at least one water mist jet at that location. While the jets are shown as disposed horizontally on opposite sides of the kiln, they may be disposed through the arch and direct their sprays vertically downwardly. A flat spray may be employed or a conical spray, as desired. The shape is not critical but may be of importance in effecting heat absorption in a restricted or limited area, closely adjacent the brick settings, and when positioning the sprays and deciding on the type to be employed, the draft conditions in the kiln should be taken into consideration. The positioning of the spray should be such that substantially uniform heat absorption is obtained throughout the setting to avoid localized overheating.

Figure 4 illustrates a nozzle arrangement which is suitable for fabrication from metals normally deleteriously affected by the high heat existing in the kiln. It includes a brass nozzle 17 attached to a pipe or tube 18 which may likewise be made of brass or of iron. The nozzle has an orifice 19 (shown to exaggerated scale) adapted to create a conical spray. It has been found that any clogging or other stoppage of flow of water through the nozzle will result in a melting of the nozzle by the heat of the kiln. Since the orifice in the nozzle is quite restricted, the likelihood of clogging is not remote and since the metal can withstand the kiln temperature only when cooled by the water flowing therethrough, some means must be provided for protecting the nozzle against fusion in the event the operation of the nozzle should cease because of clogging, failure of the water line or otherwise. It has been found that by encasing the nozzle in an insulating refractory material 20 the supply of water through the nozzle may be interrupted for relatively long periods without deleteriously affecting the nozzle. The insulating refractory material also shields the nozzle and pipe from the direct effects of the radiant heat of the kiln.

As the combustible material is burned out of the bricks, they move through the burn-out zone into the maturing zone where a battery of burners 21 is provided. These burners elevate the temperature of the bricks to that degree necessary for the firing or maturing of the clay. This temperature varies, of course, depending upon the service to which the bricks are to be put, the type of clay employed, and other factors. It is important that all of the combustible material be burned out of the bricks before they enter the firing zone for, if there is any residual combustible material present when they enter that zone, the temperature in the maturing zone will rise above the desired degree and the product will be damaged or destroyed.

Upon completion of the firing, the bricks move into and through the cooling zone where their temperature is reduced to a degree sufficient to permit handling. The bricks are then sized and packaged for shipment.

As pointed out in the forepart of the specification, a high quality product may be consistently produced by this method and apparatus since rejects caused by cracking, spalling, and warping are materially reduced, and production is increased. Greater quantities of air can be supplied to the burn-out zone than heretofore and combustion of the combustible material will be more rapid since it depends upon the quantity of oxygen supplied in that zone. The more rapidly the combustible material can be burned out, the higher will be the production rate; the only limitation is the temperature permissible in the burn-out zone. The absorption of heat is so great with the present method that, even with intense burning of the combustible materials, the temperature in the burn-out zone may be maintained at the desired low limit, an accomplishment not heretofore available to the art.

While we have described and illustrated certain preferred embodiments in our invention, it will be understood that it is not limited to such form, since it may be otherwise embodied within the scope of the following claims.

We claim:

1. In the manufacture of porous insulation from a ceramic body having embedded therein combustible material which is burned out of said body in the formation thereof, the steps of elevating the temperature within said body to the ignition temperature of said combustible material, and accelerating the rate of combustion of said combustible material without overheating said ceramic body by supplying oxygen to said combustible material to accelerate the combustion thereof and introducing a mist of water in liquid form into the immediate vicinity of the body to absorb heat therefrom and maintain a desired temperature in said body during accelerated combustion of said combustible material.

2. In the manufacture of porous insulation from a ceramic body having embedded therein combustible material which is burned out of said body in the formation thereof, the steps of placing said body in an enclosure, elevating the temperature within said body to a point materially above the ignition temperature of said combustible material, and accelerating the rate of combustion of said combustible material without overheating said ceramic body by supplying oxygen to the combustible material to accelerate the combustion thereof and introducing a mist of water in liquid form into the immediate vicinity of the body to absorb heat therefrom and maintain a desired temperature in said body during accelerated combustion of said combustible material.

3. In the manufacture of porous insulation from a ceramic body having embedded therein combustible material which is burned out of said body in the formation thereof, the steps of elevating the temperature within said body to a point materially above the ignition temperature of said combustible material, and accelerating the rate of combustion of said combustible material without overheating said ceramic body by supplying oxygen to the combustible material to accelerate the combustion thereof and introducing a mist of water in liquid form into the immediate vicinity of the body in such state of subdivision that vaporization thereof is substantially instantaneous to absorb heat from the body and maintain a desired temperature in the body during accelerated combustion of said combustible material.

4. In the manufacture of porous insulation from a ceramic body having embedded therein combustible material which is burned out of said body in the formation thereof, in a continuous kiln having a preheat zone, a burn-out zone, and a maturing zone, the steps of moving said body through said kiln from said preheating zone, into said burn-out zone, elevating the temperature within the block in the burn-out zone to a temperature materially above the ignition temperature of said combustible material, accelerating the rate of combustion of said combustible material without overheating said ceramic body by supplying oxygen to the combustible material to accelerate the combustion thereof, and introducing into said kiln in the burn-out zone a mist of water in liquid form and in such state of subdivision that vaporization thereof is substantially instantaneous, the water mist being sprayed in an amount sufficient upon vaporization and heating to absorb heat from said body in amounts sufficient to prevent an increase in the temperature obtained by said body during accelerated combustion of said combustible materials sufficient to cause cracking, spalling, or incipient fusion, and moving said body into and through said maturing zone and there applying heat to said body.

5. In the manufacture of porous insulation from a ceramic body having embedded therein combustible material which is burned out of said body in the formation thereof, the steps of igniting said combustible material within said body, and accelerating the rate of combustion of said combustible material without overheating said ceramic body by supplying air to said combustible material to accelerate the combustion thereof and introducing a mist of water in liquid form into the immediate vicinity of the body to absorb heat from said body by vaporization and heating of the water and thereby maintain a desired temperature in said body during accelerated combustion of said combustible material.

6. In the manufacture of porous insulation from a ceramic body having embedded therein granulated cork which is burned out of said body in the formation thereof, the steps of elevating the temperature within said body above the ignition temperature of the cork granules, and accelerating the rate of combustion of the cork granules without overheating the ceramic body by supplying air to the cork granules to accelerate the combustion thereof and simultaneously supplying a mist of water in liquid form into the vicinity of the burning body to absorb heat therefrom and maintain a desired temperature during accelerated combustion of the cork granules.

HENRY C. BROWN, Jr.
BOYD R. ABBOTT.